United States Patent [19]

Cottrell, Jr.

[11] 4,070,331

[45] Jan. 24, 1978

[54] METHOD OF MAKING MOLDING COMPOUNDS AND PRODUCTS PRODUCED THEREBY

[75] Inventor: Walter D. Cottrell, Jr., Newark, Ohio

[73] Assignee: Owens-Corning Fiberglas Corporation, Toledo, Ohio

[21] Appl. No.: 751,567

[22] Filed: Dec. 17, 1976

[51] Int. Cl.$^2$ .......................... C08K 3/20; C08K 3/34
[52] U.S. Cl. ...................................... 260/38; 106/90; 260/57 C
[58] Field of Search .................... 260/38, 57 C, 29.3; 106/90

[56] References Cited

U.S. PATENT DOCUMENTS

| | | |
|---|---|---|
| 3,245,947 | 4/1966 | Hanson et al. ................. 260/57 C |
| 3,944,515 | 3/1976 | Foley et al. ....................... 260/38 |
| 3,956,227 | 5/1976 | Foley et al. ....................... 260/38 |

*Primary Examiner*—Sandra M. Person
*Attorney, Agent, or Firm*—Ronald C. Hudgens; Patrick P. Pacella; William P. Hickey

[57] ABSTRACT

A controlled reaction is had by reacting a phenol monomer with a basic catalyst to form a phenolate salt and the phenolate salt is then reacted with an aldehyde while dispersed throughout the inorganic filler of a molding compound. The reaction is stopped at a fusible state to produce a molding compound.

15 Claims, No Drawings

METHOD OF MAKING MOLDING COMPOUNDS AND PRODUCTS PRODUCED THEREBY

The present invention relates to a controllable and improved method of producing molding compounds of aldehyde condensates directly from the monomers and to the materials produced thereby.

BACKGROUND OF THE INVENTION

The condensation reactions of aldehydes, and particularly the condensation reactions of phenols and aldehydes are, or can be, quite violent, inasmuch as they generate a considerable amount of heat. Aldehyde condensate resins are relatively cheap and have been used as binders for molded articles, and foundry molds, for a long time. Aldehydes can be reacted with donors of hydrogen atoms, as for example, benzene rings containing hydroxyl groups, amines including urea, dicyandiamide, and melamine, etc., to form alkanol groups which then react with other hydrogen donors by splitting off water. These reactions liberate a considerable amount of heat and because water is also liberated, the aldehyde condensate resins are usually made in water solutions. Some control of the reaction is usually achieved by flashing water from the solutions. In addition the reactions are usually carried out in kettles containing cooling coils or jackets, so that the reactions can be stopped before the condensate resins reach a completely cross-linked and infusible state. The fusible partial condensates at this point are usually solids at room temperature and are used as binder forming materials for porous articles and electrical applicators.

The fusible B staged aldehyde condensates give off water when they react with further aldehyde to produce the infusible C-stage. When such aldehyde condensates are to be used as molding compounds, they are mixed with fillers, and are compressed between heated surfaces to cross-link the partial condensates. One of the problems with such molding compounds is that the water liberated tends to decrease the bond strength that is produced with the fillers and/or it produces porosity in the finished molded article.

Where the partial condensates are to be used to produce porous structures, such as insulation, foundry molds, etc. water escapes during molding without deliterous effects. Heretofore, aldehyde condensates, and particularly phenol formaldehyde have been limited to such useage.

Resorcinol and aldehyde have also been added to aqueous mixtures of portland cement and sand (concrete) to produce a high early strength without changing the crystal structure of the hydraulic cement (see Column 4, Collins et al. U.S. Pat. No. 3,216,966). No particular problem is produced by the heat and water liberated in concrete because the reactants comprise such a small percentage of the materials present.

In a recent U.S. Pat. No. 3,944,515 there is disclosed a process wherein the reaction of portland cement, phenol, formaldehyde, and urea is carried out in the presence of ice in a stainless steel vessel that is equipped with an agitator and an indirect heat exchanger. Even though ice is utilized, the reaction gives off so much heat that the control of the reaction requires constant attention and special equipment for removing the heat of the reaction.

An object of the present invention is the provision of a new and improved method of producing a molding compound whose binder is an aldehyde condensate resin that is so controllable that the molding compound can be made from monomers without first making a precondensate.

A further object of the present invention is the provision of a new and more controllable process for reacting phenols and aldehydes.

Further objects and advantages of the invention will become apparent from the following description of the preferred embodiments.

In order that the advantages of the present invention will be more readily apparent, an understanding of the prior art as above described should first be understood.

As used in the present specification, the term aldehydes will be used to connote materials represented by the general formula RCHO as well as polymers thereof, and will include formaldehydes, acetylaldehyde, paraformaldehyde, etc. The term phenol materials is used in the broad sense to connote all materials containing a phenolic hydroxyl group, i.e. an OH group on a benzene ring, as for example, phenol – the lower member of the group, rescorcinol, catacol, etc. which are mildly acidic in nature and have three or more labile hydrogens.

DESCRIPTION OF THE PREFERRED EMBODIMENTS

According to the present invention, the reaction between a phenol and an aldehyde to form the binder of a molding compound is carried out in the presence of a base. Any relatively strong base can be used and the preferred bases are $Ca(OH)_2$, $Ba(OH)_2$ and $Mg(OH)_2$. This base is first reacted with the phenol material to form the phenolic salt. When portland cement is used as a filler, sufficient free calcium hydroxide exists throughout the portland cement to act as the catalyst for the reaction. In this case, the portland cement is reacted with the phenol, preferably after the portland cement has been partially hydrated, but is in a dry state. Phenol inhibits the hydration of portland cement and so by first hydrating the cement, water can be incorporated in a manner providing a dry material. The mixture of the filler, and calcium phenolate salt is then mixed with an aldehyde, preferably in the solid state, and is thoroughly mixed. A reaction proceeds without the further addition of water in a very controlled manner to a B-stage to form a molding compound. If the molding compound is in the form of thin sheets or has sufficient surface to volume ratio, the reaction will slow down after it reaches the B-stage, so that very little, if any, additional cooling is necessary to stop the reaction, when the resin is in a proper state for molding.

EXAMPLE 1

The following materials in parts by weight were mixed according to procedures which will hereinafter be designated "A" and "B" respectfully.

Procedure A

In this procedure 52.83 parts of portland cement was mixed with 7.89 parts of water and was aged 5 days to hydrate the cement. The resulting mixture was ground into a fine powder, and 8.79 parts of water was mixed therewith. This wet mixture was then introduced into 69.51 parts of melted phenol at 60° C and reacted for 30 minutes. The reaction proceeded to a dry state and the phenol cement reaction product was then ground into a fine powder and was mixed with 24 parts of paraformaldehyde. The mixture was spread out on a surface to a thickness of approximately ⅛-inch; and after a period of time, a reaction was self-initiated and a temperature of approximately 200° F developed. Thereafter, the temperature started to decrease. Portions of the molding compound so produced were then molded at 300° F and 1,000 psi for 3 minutes. The molded parts had a strength comparable to those made from the same materials, but in which a resin was first made of the phenol and paraformaldehyde to form a resole, as is done in conventional processes.

Procedure B

According to this procedure, which is not in accordance with the present invention, a portland cement, phenol and paraformaldehyde were blended together in a dry state. To this blend was added 16.68 parts of water and the resulting blend was allowed to sit at room temperature. Within 40 minutes, the mixture was boiling. At 45 minutes the boiling was vigorous and the reaction would be characterized as violent. After one hour, a viscous hot paste was obtained, and a portion thereof was used to mold parts in the same manner as described above. After approximately one hour, 15 minutes, the material had crosslinked to such a state thet it was too hard for molding.

EXAMPLE 2

In prior art processes wherein an aldehyde and phenol are first reacted to form a resole, and the resole is used as the binder forming ingredient, the water that is present in the resole must be removed during cure. The present example demonstrates that the materials can be blended together dry and a reaction initiated with the result that much less water must be removed prior to and during molding. The following materials given in parts by weight were blended together dry.

| Hydrate of cement modified phenol | 100 parts |
|---|---|
| Paraformaldehyde | 24 parts |
| Calcium Carbonate | 24 parts |
| Mica | 10 parts |
| Zinc Stearate (Mold Release Agent) | 3 parts |
| Chopped Glass Fiber Strand (⅛-inch lengths) | 30 parts |

The hydrate of cement modified phenol was prepared in the same manner as given in Example 1 above. The material was spread onto a surface in a layer approximately 1-inch thick and was allowed to remain for approximately 1 hour. During this time, an exotherm took place following which the temperature began to drop. When the material is molded at 300° F and 1,000 pounds per square inch parts having a tensile strength of approximately 6,000 psi and a flexual strength of approximately 16,000 psi are produced.

EXAMPLE 3

A molding compound is made of the following materials:

| Material | Parts by Weight |
|---|---|
| Phenol | 38.2 |
| Calcium hydroxide (powdered) | 10.0 |
| Ca CO$_3$ (powdered filler) | 105.0 |
| Paraformaldehyde (powdered) | 18.2 |

The phenol is melted and the powdered calcium hydroxide slowly added thereto with mixing. Heat is given off and a paste is formed. In some instances, the water that is in the calcium hydroxide will be sufficient for the reaction and in some instances, a few parts by weight of water may be desired to be added to speed up the reaction. The calcium phenolate salt is formed and after the material is cooled, it is pulverized to a flowable powder. The paraformaldehyde is dry blended with the CaCO$_3$ filler and thereafter the calcium phenolate salt is added and slowly mixed therewith. The material is then heated in a thin wall container to a temperature of 85° C and a reaction is initiated. The material is slowly mixed to control the reaction for about 10 minutes during which time the thin walled vessel is cooled to keep the temperature at approximately 110° C. After the exotherm has subsided, the material is cooled to room temperature. In those instances where the molding compound is desired to be in the form of a flowable solid, the material is then dried in a vacuum with a small amount of heat and is then pulverized as necessary for the end use.

Inorganic fibers can then be blended therewith where a fibrous reinforcement is desired. Preferably, however, the inorganic fibers are blended with the filler and paraformaldehyde before the reaction is initiated. The material when molded as given in Example 2 using 15% by weight of total solids ¼-inch long chopped glass fibers has substantially the same properties as given in Example 2.

EXAMPLE 4

The procedure of Example 3 is repeated, excepting that Mg (OH)$_2$ is used in place of the calcium hydroxide. The materials produced have substantially the same properties as does the material of Example 3.

Any type filler can be used with the binder forming ingredients whether or not they absorb water, as do the wood fillers of the prior art. The present invention produces a resin insitu and permits this to be done directly from monomers by reason of the controlled reaction provided by the present invention. The water liberated during the reaction can be utilized to provide the necessary contact of the reactants spaced throughout the fillers. Unlike the prior art processes using resoles, the present invention permits molding compounds to be made from inert organic fillers which for all intent and purposes do not absorb water, so that the present invention provides molded parts that are self-extinguishing, very inexpensive, have excellent weathering properties, low water absorption rates, high densities, and a high level of strength. In general, molding compounds providing these properties can be made utilizing approximately 50% to approximately 85% of inorganic fillers including glass fiber reinforcements, and from approximately 50% to approximately 15% of the aldehyde condensate forming materials. The aldehyde and phenol should be used in a mole ratio of at least 2. Nothing is gained by using a ratio greater than 3. The ratio will usually be in the range of from 2.5 to 3.0. Any inorganic fibers can be used as reinforcements and they will preferably be used in the range of from approximately 5% to approximately 30% by weight of the total solids of the molding compound.

It will now be seen that there has been provided a new and improved procedure for producing a molding compound directly from monomers, preferably dry, and in which a phenol material is present as the phenolic salt of the catalyst that is used for the condensation reaction. The materials are preferably mixed dry, although a small amount of water may be added to initiate a reaction after the materials are blended together in the dry state. Because the reaction is so controllable, dry monomers can be utilized, and any proportion of fillers can be mixed therewith. This in turn aids in controlling the exotherm that is produced by controlling the contact of the reactants.

While the invention has been described in considerable detail, I do not wish to be limited to the particular embodiments shown and described and it is my intention to cover hereby all novel adaptations, modifications, and arrangements thereof which come within the practice of those skilled in the art to which the invention relates.

We claim:

1. A method of producing molding compounds from phenol aldehyde condensates that are produced by means of a basic catalyst comprising: reacting a phenol monomer with the basic catalyst for the reaction to form a phenolate salt; reacting the phenolate salt with the aldehyde therefor in relative proportions to form the phenol-aldehyde condensate and while dispersed throughout the inorganic filler of the molding compound, and causing the reaction to stop at a fusible state.

2. The method of claim 1 wherein the basic catalyst is dispersed throughout the inorganic filler before the phenol is reacted therewith.

3. The method of claim 1 wherein the aldehyde is a solid and the solid aldehyde is dry blended with the filler and phenolate salt before the reaction is initiated.

4. The method of claim 3 wherein free water is eliminated and the material is subdivided to a flowable solid.

5. A method of producing molded parts comprising: compressing the product of claim 1 between heated surfaces to finish crosslinking the incompletely crosslinked condensate.

6. A method of producing molded parts comprising: introducing the flowable solid of claim 4 into a heated mold, and further crosslinking the fusible condensate into an infusible state.

7. A method of producing molding compounds comprising: hydrating a base containing inorganic hydratable cement, pulverizing the hydrated cement, reacting the pulverized hydrated cement with a material containing a phenolic hydroxyl group, mixing the reaction product with an aldehyde in relative proportions to form the phenol-aldehyde condensate, and reacting the phenolic reaction product and aldehyde into a fusible incompletely crosslinked condensate.

8. The method of claim 7 including the step of cooling the mixture containing the fusible condensate to prevent complete crosslinking.

9. The method of claim 8 including the step of subdividing the product of claim 8 into a flowable solid.

10. A molding compound comprising: a fusible partial condensate of an aldehyde and a phenolate of Portland cement in relative proportions to form a phenol-aldehyde condensate resin.

11. A molded article comprising the crosslinked state of a phenolate of Portland cement and an aldehyde in relative proportions to form a Portland cement filled phenol-aldehyde condensate resin.

12. A molded article comprising the crosslinked state of the material of claim 10.

13. A molding compound comprising: the reaction product of Portland cement and a material containing a phenolic hydroxy group, and the reaction product of Portland cement and formalin, said reaction products in turn being reacted in relative proportions to give a cement filled - phenol-aldehyde condensate resin.

14. The molding compound of claim 13 reacted into an incompletely crosslinked fusible condition.

15. A molded article comprising the reaction product of claim 14.

* * * * *